United States Patent Office 3,246,765
Patented Apr. 19, 1966

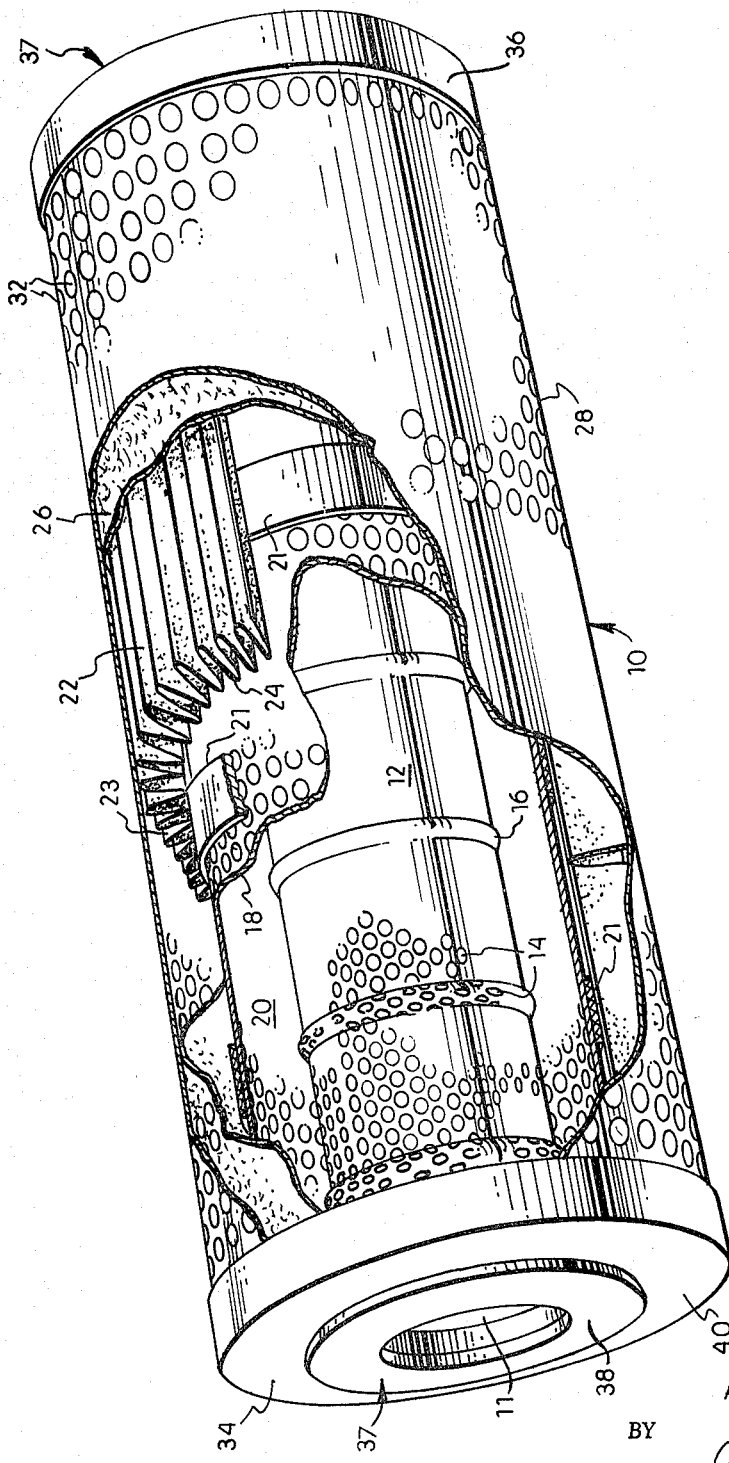

3,246,765
FILTER DEVICE
Arthur A. Murphy, Lovettsville, Va., and James L. Colpo, Germantown, Md., assignors to Bowser, Inc., Cookeville, Tenn., a corporation of Indiana
Filed Nov. 13, 1962, Ser. No. 237,234
1 Claim. (Cl. 210—349)

This invention relates to a filter device for hydraulic oil or other liquids and is especially adapted for the filtering of foreign materials from liquids which are used under high pressures and substantial velocity.

In some hydraulic applications the system requires a substantial volume of fluid under pressure as for example in vehicle systems having hydraulically operated lifts or the like. In such systems fluid pressures and fluid velocities are of high magnitude and fluctuate rapidly according to the operational requirements of the vehicle. It is essential that the fluid in such systems move freely and therefore a special requirement is presented for filter elements which are capable of filtering out small particles and at the same time offer low resistance to fluid passage and not be prone to destruction or breakage when subjected to fluid pressure, shocks, or surges, velocities and fluctuations of a high magnitude.

It is accordingly one of the principal objects of the present invention to provide a filter device which is capable of removing a substantial range in size of contaminants to restore a hydraulic fluid to a usable contamination-free condition and will at the same time be capable of withstanding high instantaneous pressures and fluid flow rates without greatly reducing the efficiency of filter operation.

A more specific object of the present invention is to provide a filter device having filter elements which are capable of modifying the flow properties of the fluid and converting such flow properties to a form best adapted for filtering operations. For example, it is proposed to eliminate vortexing of the fluid when it is initially received by the filter and converting it to a non-turbulent form before passage through the more delicate porous filtering elements of the unit.

A further object of the invention is to provide a filter device having a soft paper porous pleated element which is capable of removing fine particle size contaminants and reinforcing means in combination therewith, which will safeguard the pleated element against damage or loss of filtering efficiency even though the fluids pass through the element at such pressures and velocities as would otherwise render the pleated element inoperative.

A further object of the invention is to provide reinforcement for a porous pleated filter element which will not impede radial flow of filtered fluid outwardly from the pleated filter element but will preclude such lateral movement of the pleated element as will produce damage to the element.

A further object of the invention is to provide a filter unit adapted to receive either a continuous or semi-continuous flow of fluid at substantial velocity and under rapid pressure changes or hydraulic shock waves and is adapted to remove contaminants from the fluid ranging downwardly to a small size, and without there resulting either excessive fluid pressure drop or damage to the filter by exposure to such magnitude of pressure changes and flow velocity.

Other objects and features of the present invention will become apparent from consideration of the following description which refers to the accompanying drawing which is an isometric view of a complete filter unit having portions thereof broken away to illustrate the interior of the unit.

The filter unit designated generally by reference numeral 10 is located within the hydraulic oil reservoir tank (not shown) of a filtering system and at all times receives a flow of fluid in the direction indicated by the arrow, regardless of direction of flow within the hydraulic system. That is, where an oppositely actuatable element is used (such as obtained in raising and lowering a bucket) the fluid flow of the system reverses directions, but in spite of such directional reversing the fluid is always caused to move through central passage 11 of the filter 10. The result is that the high pressure side of the filter is always at the interior of the filter.

The present invention is especially adapted for fluid systems which are characterized by rapid fluctuations of fluid flow and high orders of fluctuating pressure in the order of 45 to 90 gallons per minute per element. The high pressure hydraulic shock waves impose considerable requirements for structural strength in the unit, this being especially difficult to accomplish where a functional part of the filter is of insubstantial internal strength; i.e., a porous filter paper element. How this is accomplished will be explained in connection with the following detailed description.

At the center of the unit is a lightweight tubular member 12 having perforations 14 over the entire length of the tube, and regularly spaced circular ribs 16 which strengthen the tube against distortions created by hydraulic surges characteristic of the system in which the unit is installed. A second tubular member 18, also perforated, is of slightly larger diameter than tube 12 and is dimensioned to provide an annular cross-section spacing 20. The inner tubular member operates in conjunction with the annular spacing to reduce vortexing of the fluid when it is initially passed into the system via passage 11 at the inner tubular member 12. That is, before the fluid can reach the remaining portions of the filter it is first moderated from a turbulent flow condition to a less destructive form. The two tubular members are lightweight and of metallic composition such as tin plate alloyed with a substantial presence of lead so that it is more corrosion resistant than conventional tin. The material is known in the art as terneplate.

Surrounding the perforated tubular member 18 are a number of adhesive strips 21 which are spaced along the length of the filter and are adhesively joined to the root portions of a pleated filter paper element 22 to reinforce the filter element 22 against destruction under the high orders of pressure and fluid flow which occur in a radially outward direction. The reinforcing strips equalize the flow through each portion of the pleated paper 22 by keeping the pleats evenly spaced and thereby preventing an uneven distribution of pressure and also preventing a twisting of the pleats under the initial impact of a hydraulic surge.

The pleated paper element 22 must be constructed of the proper root-to-crest dimension to prevent buckling or cracking of the pleat in its center, i.e., midway between the crest 23 and root 24. When the dimension between crest and root becomes too great there is insufficient strength to the paper to prevent buckling and cracks soon develop within the structure.

For best results, it is found that a crest-to-root dimension not substantially greater than ¾ inch is recommended. The pleated paper element 22 is resin impregnated with a phenolic resin and has a particle selectivity of approximately 25 microns. The pleated element 22 is uniformly penetrated by fluid notwithstanding the four spaced reinforcements 21 because only the root portions 24 are engaged by the reinforcements 21 and fluid is free to flow through all of the other portions of the pleated element 22.

Surrounding the pleated element 22 is a perforated smooth surface paper 26 such as blue oil board, engaged by the crest portions 23 of the pleats 22 to prevent radially outward movements of the pleated element 22 which would force the pleat crests against the perforated metal and tear or cut the paper if not otherwise so retained.

The outer surface of the filter consists of a perforated shell 28 of aluminum having a sufficient strength to prevent blowing of the pleats 22 inside-out. There is a sufficient gage of metal to reinforce the filter against burst under the substantial internal pressures which develop within inlet passage 11 at the center of the filter 10. It has been found from installation usage that heavy gage aluminum of the order of 20 gage or the like, is sufficient to retain the portions of the filter in operative position. A lockseam and eutectic weld is used to join the edges of the cylinder shell 28 or canister together to prevent the longitudinal seam from opening.

One of the functions of the reinforcement support paper 26 is to provide a smooth perforated surface which will not readily extrude into the sharp cutting edges of the perforations 32 in the shell or canister 28. In the absence of the reinforcement paper 26, the softer pleated paper constituting the filter 22 would readily pass within perforations 32 and would be cut thereby.

At the ends 34 and 36 of the filter are end caps 37 each including an end gasket 38 of suitable resilient sealing material such as "Coprene" and a metallic end plate 40 of the same metal composition as tubular members 12 and 18. One of the functions of the tubular members 12 and 18 is to reinforce the end caps 37 against collapse under the substantial pressures which occur with incoming fluid of the system which varies from 40 p.s.i. to 120 p.s.i. with a flow rate varying from 0 to 60 gallons per minute in less than one second. There has been substantiated usage of the filter in which flow was obtained for 15 seconds with a complete flow and reverse of flow each minute. It has been found that the filter is capable of sustaining such rapid reversals and rates of flows at these pressures without apparent loss of filter efficiencies. Moreover, the pleats are found to be untwisted and uncracked and remain bonded in operative position.

In some operations, it is possible to eliminate the heavy gage outer aluminum canister 28 but this construction is recommended only where suitable compensation is made by increasing the gage of reinforcement 26 or where pressures and fluid flow rates will permit such change.

In operation, the filter unit 10 receives a flow of hydraulic fluid within the system under the prevailing flow rate and pressure conditions.

Before the fluid is filtered, its flow conditions are first moderated from a turbulent to a less destructive form by means of the combined action and coaction of tubular elements 12 and 18 plus the annular spacing 20 and it is only after, that the fluid passes through pleated filter element 22 which is reinforced circumferentially at spaced points by the four adhesive reinforcement strips 21. These strips may in turn be reinforced at their seams by an overlying longitudinal strip of the same composition and construction. The interior reinforcements provide increased hoop strength to the pleated element, preventing damage thereof by twisting and the root-to-crest dimension of the pleated element is maintained within dimensional limitations which prevent crocking of the pleats midway of their length, i.e., between the crest and root. The upper limit of optimum size is found to be of the magnitude of ¾ inch or so.

The outer surface of the pleated element is reinforced by a relatively non-expandable perforated member 26 against which the pleated element may be pressed without producing damage to the pleated element, this being a perforated oil board or the like.

The unit as a whole is engaged by a corrosion resistant perforated canister 28 which holds the members against bursting from the interior pressure. The unit as described was found to have a capacity for continuously filtering fluids at pressures substantially greater than the upper limit of pressures previously obtainable with a pleated filter paper element. By means of the present invention, not only are higher pressures obtainable but surges of pressure are encountered and can be resisted by a relatively weak and pliable pleated filter paper element. The results of the invention are found to be obtainable by means of novel reinforcement means for the pleated element and by additional means for moderating fluid flow under high pressure characterized by surges of flow.

Although the present invention has been illustrated and described in connection with a single example embodiment it will be understood that this embodiment is illustrative and by no means restrictive of the invention. It is to be expected that those skilled in this art can make revisions and adaptations to suit individual design preferences and it is understood that such changes which incorporate the disclosed principles are intended to be included within the scope of the claims as equivalents of the invention.

We claim:

An inside-out filter element for a liquid system having high surge pressures comprising, in combination:
 (a) an inner concentric perforated cylindrical member and outer concentric perforated cylindrical member, said outer member being spaced from the inner member to reduce impact of the liquid as it passes therethrough,
 (b) a number of spaced circular ribs disposed on the said inner member for strengthening the inner member,
 (c) a cylindrical filtering element of pleated paper surrounding the outer perforated cylindrical member,
 (d) a number of circular adhesive reinforcement members spaced along the root of the pleated paper filtering element to hold the pleats apart to prevent the pleats from grouping thereby equalizing the flow of liquid through said filtering element and serving to prevent the pleats from twisting under the initial impact of the liquid entering said element,
 (e) a perforated canister surrounding the filtering element to prevent the pleated paper from bursting when subjected to the high pressure of the liquid,
 (f) a smooth surface paper member disposed between the filtering element and the canister, said paper member engaging the crest portions of the pleats of the filtering element thereby preventing the crest portions from radially outward movement against the perforated canister, and
 (g) means for sealing the ends of the filter element.

References Cited by the Examiner

UNITED STATES PATENTS

| | | | |
|---|---|---|---|
| 2,626,056 | 1/1953 | Macro | 210—442 X |
| 2,749,265 | 6/1956 | Fricke et al. | 210—493 X |
| 2,750,042 | 6/1956 | Wilkinson | 210—315 X |
| 2,770,426 | 11/1956 | Sievers | 210—437 X |
| 2,877,902 | 3/1959 | Chose et al. | 210—440 |
| 2,914,179 | 11/1959 | Foust | 210—493 X |
| 2,915,426 | 12/1959 | Poelman | 210—493 X |

REUBEN FRIEDMAN, *Primary Examiner.*

HERBERT L. MARTIN, *Examiner.*